United States Patent [19]

Katagiri

[11] Patent Number: 5,333,356
[45] Date of Patent: Aug. 2, 1994

[54] ASSEMBLY FOR CONTROLLING TURN OF A HINGE PIVOT

[75] Inventor: Takashi Katagiri, Oe, Japan

[73] Assignee: Santo Industries Co., Ltd., Osaka, Japan

[21] Appl. No.: 967,825

[22] Filed: Oct. 28, 1992

[30] Foreign Application Priority Data

Nov. 1, 1991 [JP] Japan .................. 3-315419
Aug. 24, 1992 [JP] Japan .................. 4-248633

[51] Int. Cl.⁵ .................. E05C 17/64; E05D 11/08
[52] U.S. Cl. .................. 16/340; 16/342
[58] Field of Search .................. 16/340, 339, 343, 342

[56] References Cited

U.S. PATENT DOCUMENTS

| | | | |
|---|---|---|---|
| 1,004,237 | 9/1991 | Brandes | 16/340 |
| 2,698,958 | 1/1955 | Adams | 16/340 |
| 4,018,104 | 4/1977 | Bland et al. | 16/340 |
| 4,639,147 | 1/1987 | Schwarz | 16/340 |
| 4,976,007 | 12/1990 | Lam | 16/342 |

FOREIGN PATENT DOCUMENTS 1245572 9/1971 United Kingdom .................. 16/340

*Primary Examiner*—Carmine Cuda

[57] ABSTRACT

An assembly for controlling turn of a hinge is mounted within one section of a hinged structure such as a laptop, palm-top or handy personal computer. In the assembly housing, there are arranged an elongated pivot, a cylindric plastic sleeve having an aperture for setting the pivot, and a socket having a frusto-conical aperture. The sleeve is usually of a truncated biconical shape and has some slot extends axially to one or other end thereof. The inner surface of the housing bore inclines axially in the opposite direction to the inner surface of the socket so that the inclined inner surface can contact with the other frusto-conical outer surface of the sleeve.

6 Claims, 4 Drawing Sheets

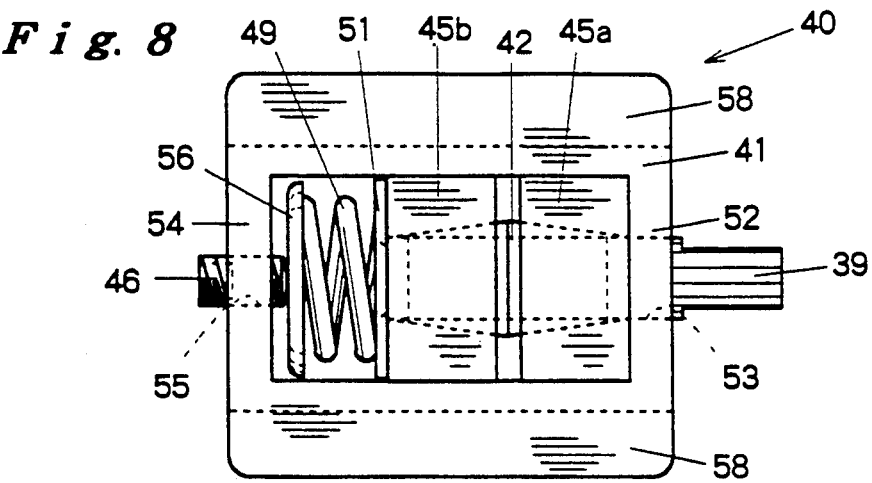
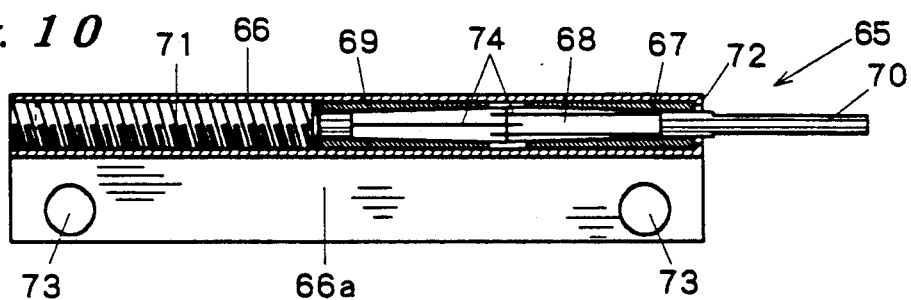
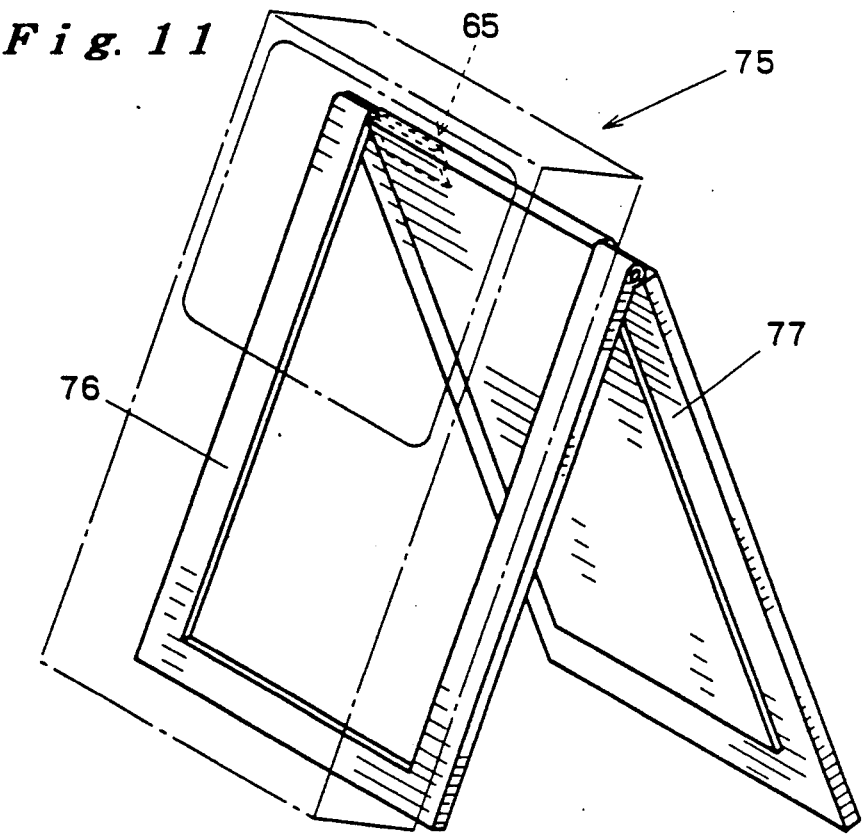

Fig. 9
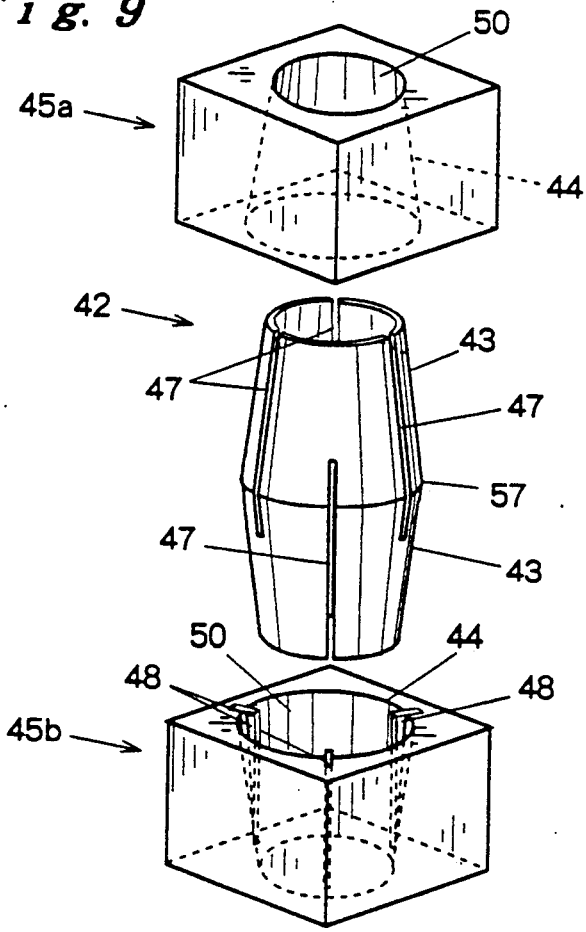
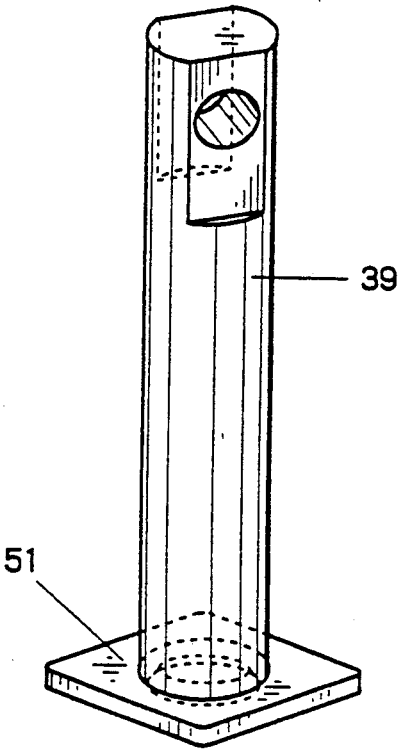

ASSEMBLY FOR CONTROLLING TURN OF A HINGE PIVOT

BACKGROUND OF THE INVENTION

The present invention relates a small-scaled control assembly with a frusto-conical plastic sleeve arranged in a housing, and more particularly to a control assembly employed generally for a hinged structure including several personal computers with an opening and closing display unit, a stand for a portable television set, an adjustable lamp with support arms, electric goods with a lid or the like.

Laptop, palmtop or handy personal computers must be made as compact and light as possible for convenience of carrying and also must be so constituted that a small display unit with a liquid crystal panel can open and close. In order to rest the display unit at a desired position as it turns about an angle of almost 120 degree from the surface of the body, the computer is required to be provided with an assembly for controlling the turn of a pivot attached to a hinge. It is also necessary to reduce the area occupied by the control assembly as much as possible because many electronic circuit substrates are present and panel wires are complexly distributed within the personal computer.

The known control assembly used for opening and closing the display unit has a thick coil spring fastened around the hinge pivot and both ends of the coil spring are fixed to the housing. As the pivot is tightened with strong torsion of the spring, the display unit rests at a desired opening position. With relation to the known assembly, about two times the force is required to start the opening and closing motion as compared with the turning movement of the display unit, as it is impossible to control the opening and closing motion due to constant tightening of the hinge pivot with uniform strong torsion. In case the opening and closing motion of the display unit is carried out repeatedly, a contact part of the pivot with the spring is worn out and frictional resistance in the hinge increases more and more as metal grounds enter into the contact part. Consequently, the opening and closing motion of the display unit becomes difficult. Also, the cost of producing the known assembly is very expensive because the inner surface of the spring and the outer surface of the pivot are required to maintain a high accuracy to keep uniform torsion.

According to several opening and closing devices for electric goods with a lid, this applicant who applied the present invention to the Japanese Patent Office had already proposed, for example, as described in Japanese Open Publication 56-140354, 57-115345, 58-29945, 58-148165, 58-171468, 58-174463 or 58-195766. However, since the devices mentioned above are disposed vertically in any case, it is impossible substantially to dispose one of the devices inside a portable and small-scaled electronic product such as a palmtop, laptop or notebook-sized personal computer.

SUMMARY OF THE INVENTION

The present invention provides an assembly for controlling turning movement of a pivot disposed in a connecting section of a hinged structure. In this specification, the term "hinged structure" means a machine, device or the like with at least one adjustable connection, which includes a notebook-sized, laptop or palmtop computer with an opening and closing display unit, a stand for a portable television set, an adjustable lamp with support arms, electric goods with a lid or the like. It is possible to arrange the assembly horizontally inside the connecting section, for example, each one of a corner of the opening and closing display unit and the computer body. The assembly has a small-scaled housing fixedly secured to a corner of the display unit or a computer body. Within the housing, there are movably disposed an elongated pivot projecting from an opening of the housing, an externally tapered brake sleeve having a central aperture for setting the pivot, and a socket having a central frusto-conical aperture. The inner surface of the aperture of the socket can contact axially the frusto-conical outer surface of the sleeve. Usually the sleeve may be made from engineering plastics that are excellent in durability, and the housing and socket are made from normal plastics or metal. It is preferable that the inclination of the frusto-conical outer surface of the sleeve is gentle and corresponds substantially to the frusto-conical inner surface of the socket. If the sleeve is of a simple frusto-cone shape, the socket only may have the central tapered hold, into which the smaller end of the sleeve extends, and the pivot opening of the housing is straight axially. Instead of inclining the inner surface of the aperture of the socket, the opening only of the housing may be partially tapered, into which the smaller end of the sleeve extends, and the socket has a central straight hole.

Preferably the sleeve may be of a truncated biconical shape. In such a case, the inner surface of the pivot opening of the housing inclines axially in the opposite direction to the inner surface of the socket so that the inclined inner surface can contact axially the other frusto-conical outer surface of the sleeve. At least one radially continuous slot extends axially to one end of the sleeve. In using the sleeve of the truncated biconical shape, preferably two or more slots may extend alternately to one or other end thereof at equal circumferential distances.

Furthermore, the housing may be provided with one or more projecting stopper on the inclined inner surface thereof. It is possible to put the stopper in the longitudinal slot of the sleeve. By means of the stopper, the sleeve does not rotate together with the pivot. When the housing is fixedly secured to the corner of the display unit, the sleeve turns together with the housing. Consequently, the sleeve is so compressed radially that a round aperture of the sleeve conforms with a circular surface of the pivot and then is effectively urged against the pivot. In the process of forming the housing, the stopper as a linear projection may be defined on the inner surface thereof, or a metal piece for the stopper may be inserted into the inner surface thereof. An adjusting member may be a nut attached to the threaded end of the pivot, or a screw attached to a bore tapped on a housing wall. On the one hand, the clamping between the nut and the fixed collar of the pivot urges the socket pipe forward to the sleeve. Between the nut and a front face of the socket or housing, two or more belleville springs are preferably placed and then the clamping of the sleeve down on the pivot is adjustable by tightening or loosening the nut. On the other hand, a coil spring may be placed between the screw and a rear face of the socket in the housing. The clamping of the sleeve down on the pivot is adjustable by tightening or loosening with the screw.

The various aspects of the invention will be more fully understood when the following portions of the specification are read in conjunction with accompanying drawings wherein:

It is accordingly the object of the invention to provide a control assembly for opening and closing easily and smoothly a turning section of a hinged structure by hand and resting the section at a desired turning position.

It is another object of the invention to provide a small-scaled control assembly which can be mounted on a hinged structure even if there is only a small setting space.

It is still another object of the invention to provide a control assembly which provides an adjustable opening and closing motion of a turning section by tightening or loosening with a nut or screw.

These and other objects, features and advantages of the invention will become more apparent to those skilled in the art from the following description.

BRIEF DESCRIPTION OF THE DRAWINGS

FIG. 8 is a rear elevational view showing a third embodiment seen from the underside of the housing;

FIG. 9 is a fragmentary perspective view of the control assembly shown in FIG. 8;

FIG. 10 is a longitudinal sectional view showing a fourth embodiment; and

FIG. 11 is a perspective view of a stand for a portable television set with the control assembly shown in FIG. 10.

DETAILED DESCRIPTION OF THIS INVENTION

Figure 1:
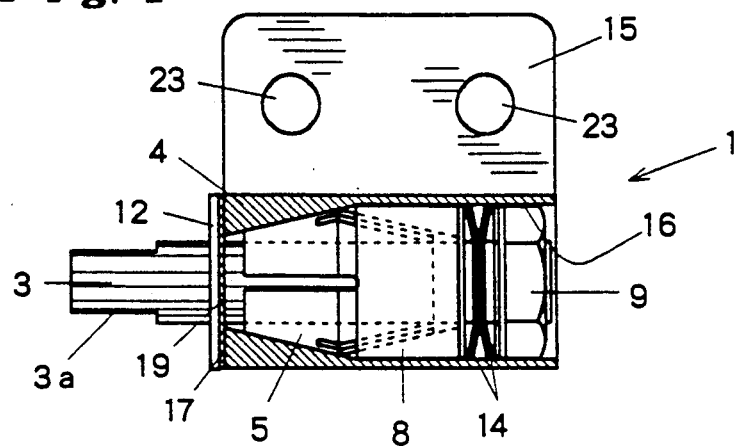
FIG. 1 is a longitudinal sectional view of a control assembly of the invention.
Figure 6:
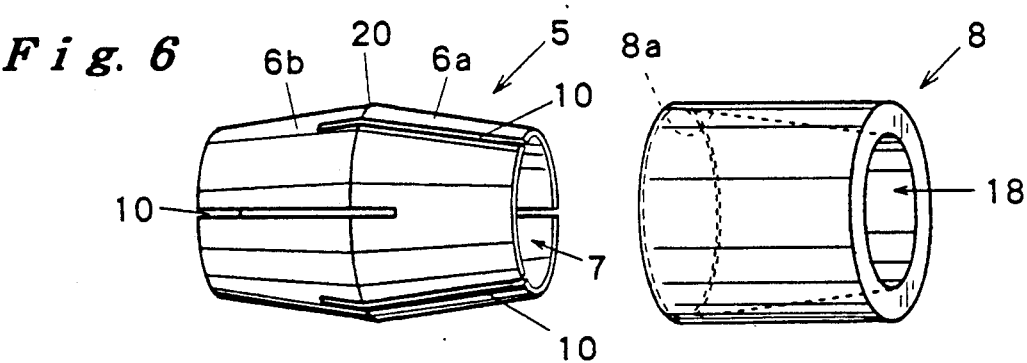
FIG. 6 is a fragmentary perspective view of a brake sleeve and a socket pipe shown in FIG. 1.

Referring to the drawings, FIG. 1 illustrates the general organization of a control assembly 1 according to the present invention. The assembly 1 includes a housing 4 having a flat and rectangular portion 15, which is 20 mm. by 18 mm. in dimensions. The housing 4 is made from engineering plastics. A side penetration bore 16 of the housing 4 has the fore portion 16a of a frusto-conical shape and the rear portion of a 5 mm. inside diameter. Within the housing 4, a brake sleeve 5 of a truncated biconical shape having a central aperture 7, and a socket 8 having a central frusto-conical aperture 18 are arranged. An elongated pivot 3 is then inserted into the housing bore 16, the sleeve aperture 7 and the socket aperture 18 until a disc collar 12 fixed perpendicularly to the circumference of the pivot 3 can contact with the front face 17 of the housing 4. Accordingly, the pivot 3 projects from the front face 17 of the housing 4. The fore portion 3a of the pivot 3 extends forward from the collar 12 and generally formed to a heterogeneous cross-section such as a modified round or square section. FIG. 1 shows a plastic disc slider 19 placed between the collar 12 and the front face 17 of the housing 4 in order to reduce frictional resistance. The sleeve 5 is made from engineering plastics that is excellent in durability. The sleeve 5 has a pair of three radially continuous slots 10 (see FIG. 6) which extend axially and alternately to one or other end thereof at equal circumferential distances. On the sleeve 5 of the truncated biconical shape, the length of slots 10 is longer than one half length of the sleeve 5 and thus extend over the central thick portion 20 (see FIG. 6) of the sleeve 5. An adjusting member, e.g., a nut 9 is then attached to the threaded end 13 of the pivot 3, as shown in FIG. 1. Two or more belleville springs 14 can be set on a rear portion 3b of the pivot 3 and placed between the nut 9 and the rear face of the socket 8. To prevent the nut 9 from coming loose by frictional resistance, another plastic disc slider (not shown) is preferably placed between the nut 9 and the spring 14. The inner surface 16a of the fore portion of the housing bore 16 inclines axially in the opposite direction to the inner surface 8a of the socket 8 so that the inclined inner surface 16a can contact with the other frusto-conical outer surface 6b of the sleeve 5. The inside diameter of the rear portion of the housing bore 16 is slightly larger than the outside diameter of the socket 8 and the nut 9. Furthermore, the housing 4 is provided with three projecting stoppers 11 on the inclined inner surface 16a thereof by inserting metal pieces. The width of stopper 11 is narrower than that of the longitudinal slot 10 of the sleeve 5 so that it can be put in the slot 10. The stoppers 11 are parallel to the axis of the pivot 3, the sleeve 5 and the socket 8. The stoppers 11 are defined not to come into touch with the circumference of the rear portion 3b of the pivot 3. In the process of forming the housing 4, metal pieces for the stoppers 11 are inserted into the inner surface thereof. The socket 8 is partially fitted on the sleeve 5 so that the inner surface 18a of the frusto-conical aperture 18 can contact with the frusto-conical outer surface 6a of the sleeve 5. But the front face of the socket 8 does not come into touch with the rear end circumference of the frusto-conical inner surface 16a of the housing 4. By means of the stoppers 11, the sleeve 5 turns or rests together with the housing 4 without rotating with the pivot 3 when turning the hinge, and thus the compressed sleeve is effectively urged against the pivot 3.

Figure 2:
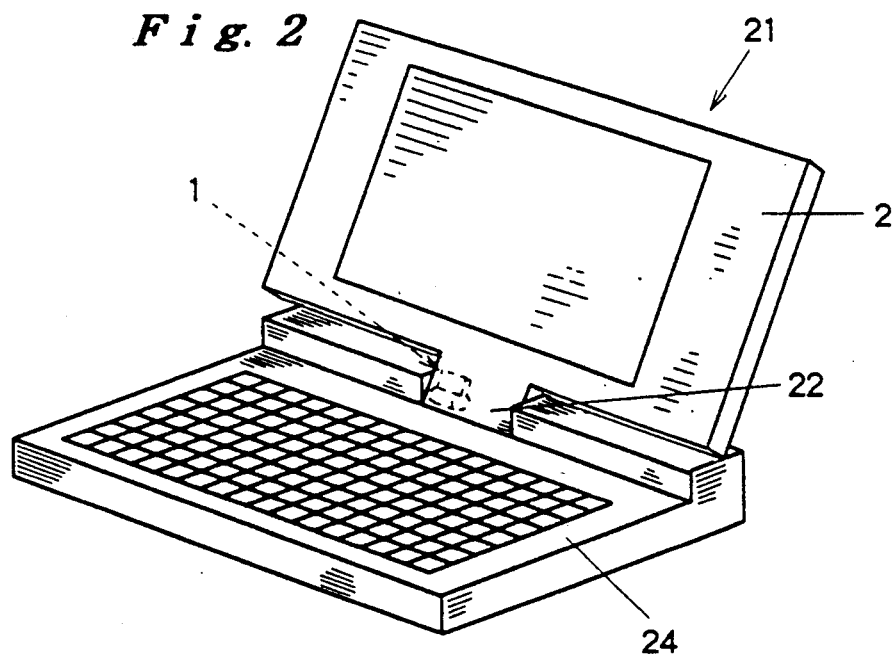
FIG. 2 is a schematic perspective view of a notebook-sized personal computer with the control assembly shown in FIG. 1.
Figure 3:
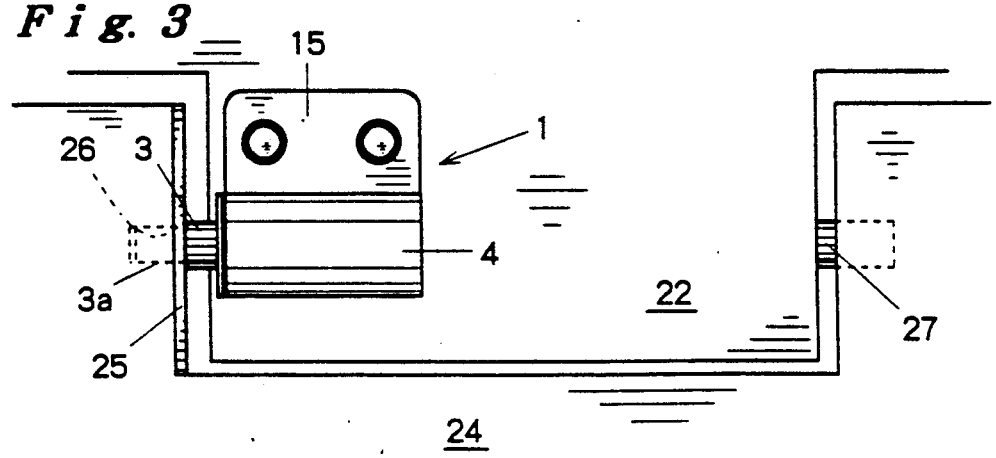
FIG. 3 is a partial elevational view of the hinge section of the computer shown in FIG. 2.
Figure 4:
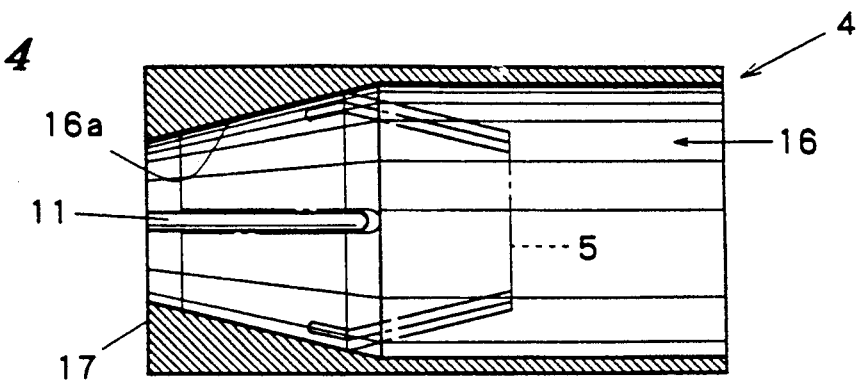
FIG. 4 is an enlarged sectional view of the housing having a stopper formed on the inner surface thereof.
Figure 5:
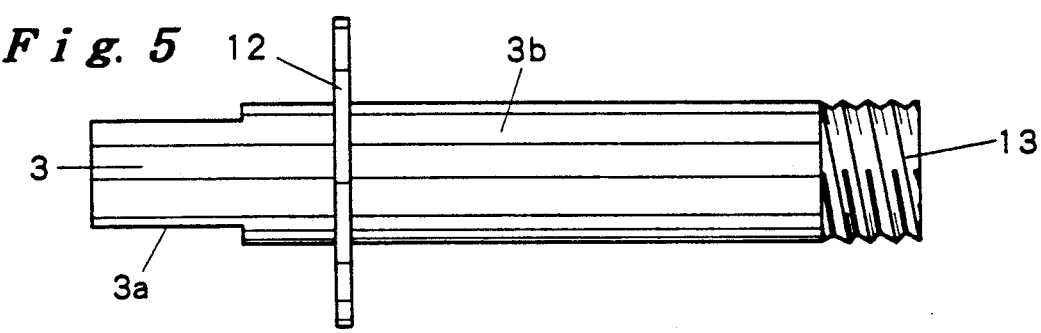
FIG. 5 is an elevational enlarged view of a pivot shown in FIG. 1.

As seen in FIG. 2, the assembly 1 mounted on a turning section, i.e., the lower projection 22 of a display unit 2 of a notebook-sized computer 21. As the upper portion 15 of the housing 4 has two penetration holes 23 and 23, the assembly 1 is bolted on the lower part 22. On the other hand, a receiving plate 25 having a hollow 26 of a heterogeneous cross-section is held in an adjacent side of a body section 24. The cross-section of the hollow 26 is similar to that of the pivot portion 3a. After mounting another pivot 27 in a known means, the pivot portion 3a is inserted into the plate hollow 26 and then the assembly 1 is fixed to the lower part 22 of the display unit 2. The assembly 1 is positioned horizontally so that the pivots 3 and 27 for the display unit 2 are disposed coaxially.

When opening and closing the display unit 2, the housing 4 and the socket 8 turn simultaneously because the assembly 1 rotates with the display unit 2. At this time, the pivot 3 rests in the housing 4 because the portion 3a thereof is held in the hollow 26 of the plate 25 fixed to the body 24. Since the socket 8 is urged forward to the sleeve 5 by the compression between the nut 9 and the fixed collar 12, the frusto-conical inner surface 18a of the socket 8 comes in touch with the frusto-conical outer surface 6a of the sleeve 5 and also the frusto-conical portion 16a of the housing bore 16 can contact with the other frusto-conical outer surface 6b of the sleeve 5. Thus, the sleeve 5 is compressed radially inward and contracts easily against the pivot 3 because six longitudinal slots 10 are made in the sleeve 5. As this result, the sleeve 5 clamps down on the pivot 3 and rests the display unit 2 at a desired turning position. If the housing 4 is provided with three stoppers 11 on the surface 16a thereof, it is certain that the sleeve 5 turns or rests together with the housing 4 when turning the display unit 2. Since the inner surface of the sleeve aperture 7 is slid on the circumference of the pivot 3, the compressed sleeve 5 keeps effectively the rotation of the pivot 3 under control. The effect of the sleeve 5 which clamps down on the pivot 3 for the display unit 2 is easily adjustable by tightening or loosening with the nut 9. As the belleville springs 14 are placed between the nut 9 and the rear face of the socket 8, the change of the opening and closing motion of the display unit 2 can be done easily according to user's choice.

Figure 7:
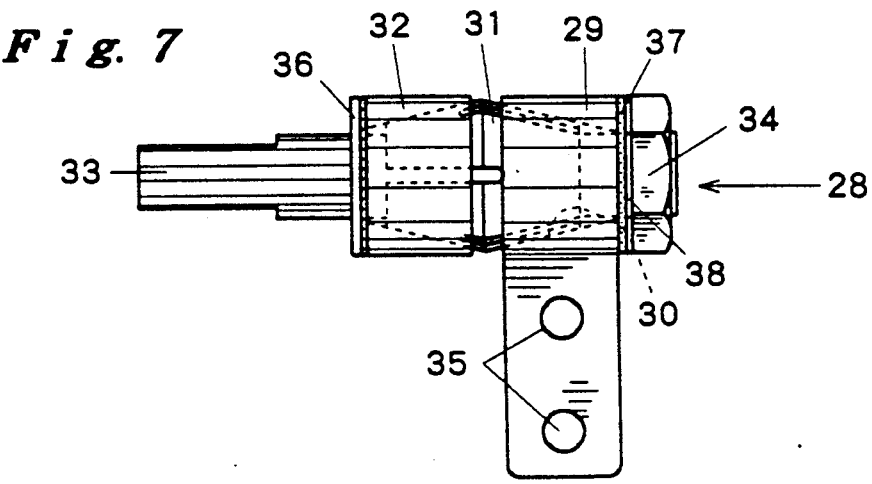
FIG. 7 is an elevational view showing a second embodiment.

FIG. 7 shows the modification of the present invention. An assembly 28 has an elongated metal housing 29 of about 10 mm. in width. The housing 29 is provided with a flat lower portion having two bolt holes 35 and 35 and a side penetration bore 30. Since the rear portion of a brake sleeve 31 of a truncated biconical shape is inserted into the housing 29, the inclined rear surface of the sleeve 31 can contact axially the inclined inner surface of the housing bore 30. Then a socket 32 having a frusto-conical aperture is fitted on the fore portion of the sleeve 31 so that the inclined inner surface of the socket aperture can contact axially the inclined fore surface of the sleeve 31. To prevent the sleeve 31 from rotating, three projecting stoppers (not shown) are shaped on the inclined inner surface of the housing 29. An elongated pivot 33 is then inserted into the socket and sleeve apertures and housing bore 30 until the disc collar 36 can contact the front face of the socket 32. The rear portion, i.e., the threaded end of the pivot 33 projects from the rear face of the housing 29 and then a nut 34 is attached to the threaded end of the pivot 33. A plastic disc slider 37 and a washer 38 are fitted on the rear portion of the pivot 33 and placed between the nut 34 and the rear face of the housing 29. By tightening or loosening the nut 34, the effect of the sleeve 31 which clamps down on the pivot 33 is easily and exactly adjustable.

The assembly 28 can be mounted on both ends of support arms of an adjustable lamp or a gooseneck lamp because it has a small size and arranged at a desired angle of the setting position. When the assembly 28 is applied to the adjustable lamp, it is preferable to use a wing nut as the nut 34. Also, the assembly 28 is suitable for a hinge of a stand for a portable television set or a lid for electric goods.

An assembly 40 in FIG. 8 includes a plastic box-type housing 41 having a square recess. According to the housing 41, the fore wall 52 has a board penetration hole 53 and the rear wall 54 has a tapped hole 55 disposed coaxially with the hole 53. The diameter of the hole 53 is larger than that of the pivot 39. A brake sleeve 42 with a truncated biconical shape and two cubical sockets 45a and 45b having the central frusto-conical aperture 50 are arranged in the recess of the housing 41. A rectangular plate 51 is rotatably attached to the rear end of the pivot 39, and the cross section of the plate 51 corresponds to that of the housing recess. The elongated pivot 39 is then passed over the one socket aperture 50, sleeve aperture and the other socket aperture 50 and inserted into the penetration bore 53 of the fore wall 52 until the plate 51 can contact the rear face of the cube 45b. Accordingly, the pivot 39 projects forward from the wall 52. The sleeve 42 has a pair of three radially continuous slots 47 (see FIG. 9) which extend axially and alternately to one or other end thereof. Because the cubes 45a and 45b are slidable axially but nonrotatable, the width thereof is slightly smaller than the inside width of the housing recess, respectively. The inner surfaces 44 of the cubes 45a and 45b incline axially in opposite directions to each other. The cubes 45a and 45b are partially fitted on the sleeve 42, respectively, so that both of the inner surfaces 44 can contact the truncated biconical sleeve 42, but they are out of contact with each other. An adjusting member, e.g., a screw 46, is then attached to the tapped hole 55 of the rear wall 54, as shown in FIG. 8. An elastic member, e.g., a compression coil spring 49, is placed between the screw 46 and the rear face of the cube 45b. Instead of the coil 49, it is possible to apply a volute spring, belleville spring, leaf spring or several elastomers. The point of the screw 46 contacts the center of a plate 56 disposed on the spring 49, and the screw 46 urges the plate 51 and the cube 45b forward, and thus the clamping of the sleeve 42 down on the pivot 39 is adjustable by tightening or loosening the screw 46. The cube 45b is provided with three projecting stoppers 48 on the inclined inner surface 44 thereof by inserting a metal piece, as shown in FIG. 9. The width of the stopper 48 is narrower than that of the longitudinal slot 47 of the sleeve 42 so that it can be put in the slot 47.

According to the assembly 40, the housing 41 is provided with flat portions 58 and 58 on the upper and lower sides thereof, as shown in FIG. 8. The assembly 41 is fixed to a body section of a handy computer (not shown) by bolting or thrusting the flat portions 58 and 58.

When opening and closing the display unit (not shown), the pivot 39 turns simultaneously with the display unit and the assembly 40 rests in the body section. Since the cube 45b is urged forward to the sleeve 42 by tightening the screw 46, the inner surface 44 of the cube 45b comes in contact with the one outer surface 43 of the sleeve 42, and also the inner surface 44 of the cube 45a can contact the other surface 43 of the sleeve 42. Thus, the sleeve 42 is compressed radially inwardly and contracts easily against the pivot 39. As this result, the sleeve 42 clamps down on the pivot 39 and rests the display unit at a desired turning position. The effect of the sleeve 42 which clamps down on the pivot 39 is easily adjustable by tightening or loosening the screw 46. Since the spring 49 is placed between the screw 46 and the rear face of the socket 45b, the change of the opening and closing motion of the display unit can be done easily according to user's choice.

FIG. 10 shows still another modification of the invention. An assembly 65 includes a plastic elongated housing 66 of a rectangular shape. An elongated brake sleeve 68 with a truncated biconical shape and two sockets 67 and 69 with a square bar shape having a central frusto-conical aperture are arranged within the housing 66. The bar-shaped pivot 70 is then passed over the one socket hole, the sleeve hole and the other socket hole and inserted into a penetration bore of the housing wall 72. In this embodiment, an elastic member such as a compression coil spring is not applied; a screw 71 is attached directly to the tapped rear portion of the housing 66; and the point of the screw 71 contacts the rear face of the socket 69. The housing 66 is provided with the fore wall 72 or other suitable stopper so that the socket 67 is not pushed out, but the pivot 70 can be taken out and in. The horizontal and longitudinal slots 74 are formed in the sleeve 68. The socket 67 and 69 are slidable axially but non-rotatable, and the inserted stopper is not formed on the inner surface of the socket. The housing 66 is provided with an attached lower portion 66a with a flat elongated shape. The lower portion 66a has two penetration holes 73 and 73 for bolting the assembly 65.

The assembly 65 can be mounted horizontally on a body portion 77 of a stand 75 for a portable television set shown by the dot-dash line in FIG. 11. The fore end of the pivot 70 is inserted into the heterogeneous cross-sectional hole (not shown) of a support 76. When turning the support 76, the pivot rotates with the support 77 and the socket 67 and 69 and sleeve 68 rests in the housing 66. The socket 69 is tightened with the screw 71, and thus the compressed sleeve 68 is effectively urged against the pivot 70.

What is claimed is:

1. A control assembly for a hinge connection between a first segment and a second segment, said assembly comprising: a pivot member mounted to the first segment; a brake sleeve disposed around the pivot member; a socket member disposed around the pivot member for engaging an edge portion of the brake sleeve, said socket member being slidable along the pivot member, said socket member with said brake sleeve being rotatable about the pivot member; adjusting means for urging the socket member against the sleeve so that the socket member compresses the sleeve radially into friction contact with the pivot member; and connecting means for connecting either the brake sleeve or the socket member with the second segment, said connecting means including a housing disposed around the sleeve and at least one stop mounted to the housing and extending into an opening defined by the sleeve, said connecting means preventing relative rotational movement between the sleeve or the socket member and the second segment.

2. The assembly of claim 1, wherein the adjusting means includes a nut disposed around the pivot member.

3. The assembly of claim 2, wherein the adjusting means further includes a spring disposed between the nut and the socket member.

4. The assembly of claim 1, wherein the brake sleeve is rotatable about the pivot member and defines a central aperture and at least one slot disposed axially of the central aperture.

5. The assembly of claim 1, wherein the socket member defines a central frustoconical aperture and the brake sleeve includes a tapered portion which extends into the frustoconical aperture of the socket member.

6. A control assembly for a hinge connection between a first segment and a second segment, said assembly comprising: a pivot member mounted to the fist segment; a brake sleeve disposed around the pivot member, said brake member having a truncated biconical shape; a first socket member and a second socket member disposed around the pivot member for engaging an edge portion of the brake sleeve, each socket member defining a central frustoconical aperture, said first socket member being slidable along the pivot member, said socket members with said brake sleeve being rotatable about the pivot member; adjusting means for urging the first socket member against the sleeve so that the socket members compress the sleeve radially into friction contact with the pivot member; and connecting means for connecting either the brake sleeve or the socket members with the second segment, said connecting means preventing relative rotational movement between the sleeve or the socket members and the second segment.

* * * * *